No. 810,722. PATENTED JAN. 23, 1906.
H. F. COOK.
VEHICLE ATTACHMENT.
APPLICATION FILED JUNE 13, 1905.
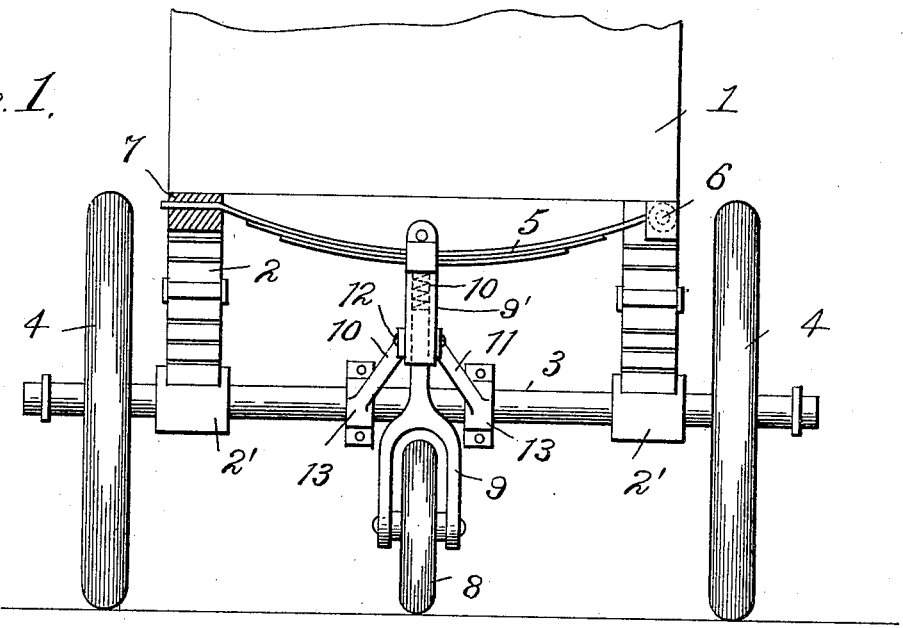
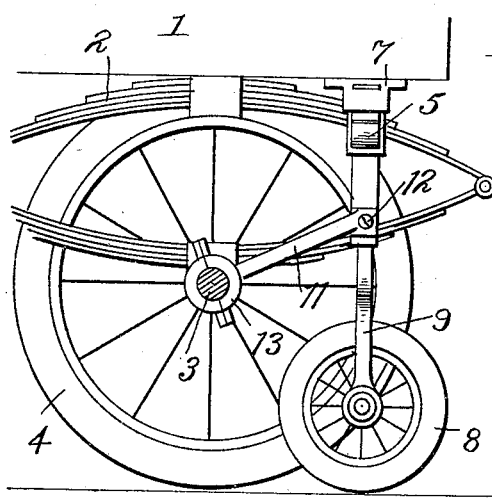
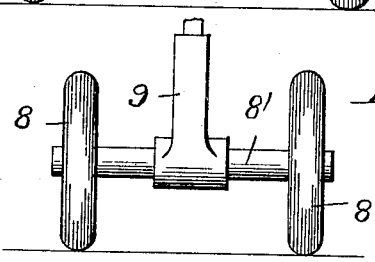
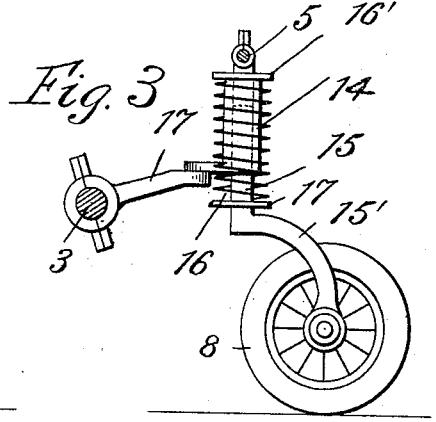
Witnesses
Inventor
Henry F. Cook
By his Attorneys

UNITED STATES PATENT OFFICE.

HENRY F. COOK, OF SAG HARBOR, NEW YORK.

VEHICLE ATTACHMENT.

No. 810,722. Specification of Letters Patent. Patented Jan. 23, 1906.

Application filed June 13, 1905. Serial No. 265,090.

*To all whom it may concern:*

Be it known that I, HENRY F. COOK, a citizen of the United States, residing at Sag Harbor, county of Suffolk, State of New York, have invented certain new and useful Improvements in Vehicle Attachments, of which the following is a full, clear, and exact description.

My invention relates to improvements in vehicle attachments; and the object of my invention is to produce an attachment which may be readily applied to an ordinary wheeled vehicle, more particularly, however, to heavy vehicles—such, for instance, as auto-trucks and the like. In heavy vehicles of this class great shocks are ofttimes imparted to the mechanisms by reason of the dropping of one or more of the wheels into depressions in the road-bed. When this happens, the entire weight of the load is brought upon the axles at the point or points of spring suspension. This undesirable and serious strain both upon the axles and upon the rest of the vehicle is entirely obviated by the use of my improvement, which consists in the use of a sixth or auxiliary wheel. This wheel is preferably positioned centrally of the vehicle-body in contact with or in proximity to the road-bed, so that when the vehicle-body sags by reason of the depression of one of the supporting-wheels the auxiliary wheel will receive the whole or a substantial portion of the load. In short, my invention consists of an auxiliary wheel arranged to come into action or to increase in action compared to the main supporting-wheels when an abnormal strain is applied to the bearing-support of the body upon the main axle.

In the accompanying drawings, Figure 1 is a rear view of a vehicle, showing the application of my improved attachment. Fig. 2 is a side view thereof. Fig. 3 is a modified form illustrating the manner of constructing the auxiliary wheel caster form. Fig. 4 represents a modification of my attachment.

The body of the vehicle is indicated at 1, to which is attached the suspension-springs 2 of ordinary construction, which are fastened at 2' in the usual manner to the axle 3. On this axle are journaled the supporting-wheels 4. A wagon-spring 5 may be either rigidly or loosely connected at one end in a suitable manner to the vehicle at 6, and loosely connected, but secured from displacement at the other end at 7 in such a manner as to have a limited horizontal movement in order to give the requisite spring to the auxiliary wheel 8. The auxiliary wheel 8 is mounted in forked support 9, the upper stem of the fork being slidably mounted in tubular guide 9', which is connected by suitable clamping means to the spring 5. A compression-spring 10 is arranged in said tubular guide 9', which bears down upon the upper stem of the forked support 9 in order to insure constant engagement of the wheel with the ground. Guiding-supports 11 are provided, having a bearing-block 12, through which the upper stem of the forked support 9 is slidably arranged. These supports may be either rigidly or loosely connected to the axle 3 by means of clamps 13. It will be seen from this arrangement that when either of the side supporting-wheels are depressed the whole weight or a substantial portion thereof will come directly upon and be supported by the auxiliary wheel.

In Fig. 3 I have shown a modification of my improved auxiliary wheel constructed in the general form of a caster. In this modified form, 14 indicates a tubular guide in which is slidably mounted the stem 15 of the fork 15', which holds the caster-wheel. A compressed spring 16 is provided for the purpose of insuring constant contact of the wheel with the ground. This spring is interposed between the flange 16' of the tubular guide 14 and the flange 17 of the fork 15' and surrounding the said tubular guide 14. The tubular guide 14 is provided with a guiding-support 17, which may be either rigidly or loosely connected to the main axle 3 of the vehicle by clamping means 13.

Referring now to Fig. 4, wherein is shown a modification of my improved attachment, I have provided a pair of auxiliary wheels 8, mounted upon axle 8'. This axle is mounted in support 9, which is adapted to be mounted in bearing 9' in like manner to the forked support hereinbefore described.

It is manifest that my improved auxiliary wheel or wheels may be attached to the front or the rear end of a vehicle and may to advantage be applied at both ends.

I would have it understood that I do not restrict myself to the specific manner described here in which the auxiliary wheel is connected to the vehicle; but the same may be connected in any suitable manner and still come within the scope of my claims.

The advantages of providing an auxiliary wheel of the construction herein set forth to heavy vehicles is apparent. In traversing rough roads where the vehicle is subjected to considerable strain it quite frequently happens that a breakdown occurs by reason of the weight of the load being thrown upon the axle at the point of spring suspension. It is to overcome this liability that my auxiliary wheel has been designed. It is manifest that this auxiliary wheel may be either in constant contact with the ground or may be located in proximity thereto and brought into contact when any of the side supporting-wheels are depressed.

Having thus described my invention, what I claim as new therein, and desire to secure by Letters Patent, is—

1. In a device of the character described, the combination of a vehicle-body, supporting-wheels therefor and auxiliary wheels normally sustaining no portion of the weight of the vehicle-body but capable of sustaining it when one or more of the supporting-wheels leave the normal plane of the surrounding surface of the road-bed.

2. In a device of the character described, the combination of a vehicle-body, supporting-wheels therefor, springs connected to said vehicle-body and auxiliary wheels normally inoperative but adapted to sustain the load of said vehicle-body when one or more of the supporting-wheels are depressed by reason of leaving the normal plane of support.

3. In a device of the character described, the combination of a vehicle-body, suspension-springs, axles carrying supporting-wheels, springs connected to the vehicle-body and auxiliary wheels connected to said springs and to said axles said auxiliary wheels normally sustaining no portion of the weight of said vehicle but adapted to support the weight of the load of said vehicle-body when one or more of the supporting-wheels are depressed below the normal plane of support.

4. In a device of the character described, the combination of a vehicle-body, suspension-springs supporting said body, axles having supporting-wheels thereon, a wagon-spring connected to the body portion of the vehicle, a tubular guide connected to said spring having slidably arranged thereon a support carrying an auxiliary wheel, a compression-spring interposed between said wagon-spring and said support said auxiliary wheel being capable of sustaining the load of the vehicle when one or more of the supporting-wheels leave the normal plane of support.

5. In a device of the character described, the combination of a vehicle-body, supporting-wheels therefor, and an auxiliary wheel so arranged as to normally not take any of the load but adapted to increase in action under the influence of an abnormal strain on said vehicle-body, substantially as and for the purpose described.

HENRY F. COOK.

Witnesses:
WILLIAM P. HAMMOND,
P. F. SMITH.